B. M. PERDUE.
BUGGY SHAFT SUPPORT.
APPLICATION FILED APR. 24, 1912.
1,050,687.
Patented Jan. 14, 1913.
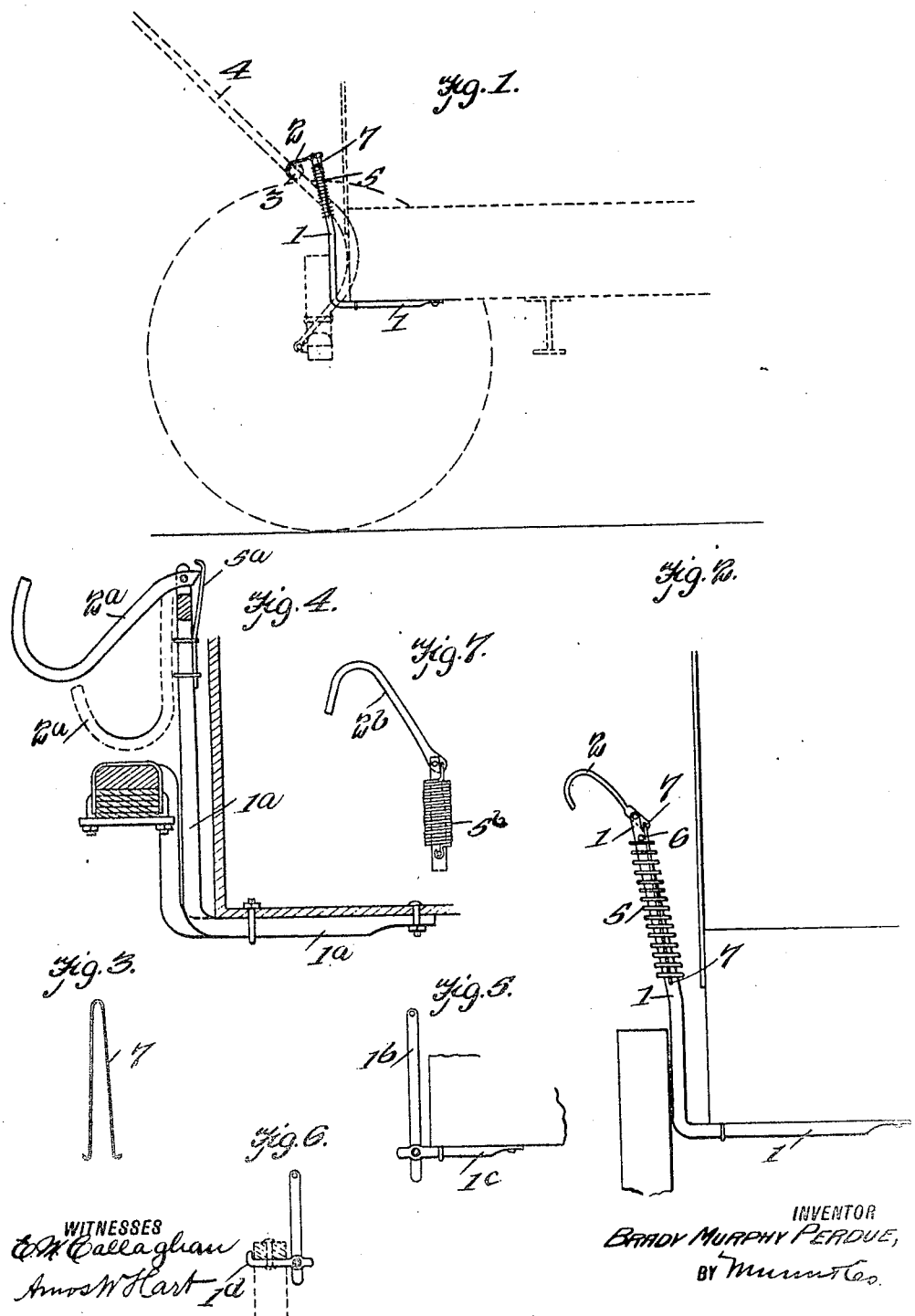
INVENTOR
BRADY MURPHY PERDUE,
BY Munn & Co.
ATTORNEYS
WITNESSES
E. M. Callaghan
Amos W. Hart

UNITED STATES PATENT OFFICE.

BRADY MURPHY PERDUE, OF FRANKLIN, KENTUCKY.

BUGGY-SHAFT SUPPORT.

1,050,687.

Specification of Letters Patent. Patented Jan. 14, 1913.

Application filed April 24, 1912. Serial No. 692,886.

*To all whom it may concern:*

Be it known that I, BRADY MURPHY PERDUE, a citizen of the United States, and a resident of Franklin, in the county of Simpson and State of Kentucky, have invented an Improved Buggy-Shaft Support, of which the following is a specification.

My invention is an improved attachment for buggies for supporting their shafts or thills in raised position when the vehicle is not in use. The attachment includes a spring-actuated hook which is pivoted to an arm or bracket fixed on the buggy front, such hook being adapted to be manually engaged with the cross-bar of the shafts and for automatic release therefrom when it is desired to lower the shafts.

In the accompanying drawing I illustrate the construction, arrangement, and operation of the invention, Figure 1 being a side view illustrating the application of my invention to a buggy and supporting its shafts. Fig. 2 is an enlarged side view of the same in the position of non-use. Fig. 3 is a side view of a spring catch forming part of the attachment. Fig. 4 is a side view of a modification. Fig. 5 is a view of a bracket adapted for vertical adjustment on the front of a buggy. Fig. 6 is a view of another modification of the bracket. Fig. 7 is a side view of another modification.

I will first describe the form of my invention illustrated in Figs. 1, 2, and 3. A right-angular arm or bracket 1 is rigidly attached to the under front portion of the buggy body and projects upward vertically between the dasher and the front spring, and a hook 2 is pivoted to the upper end of said bracket and adapted to swing vertically, so as to engage the cross-bar, or whiffletree-bar, 3, of the shafts or thills 4, and thus hold the latter in the raised position shown by dotted lines in Fig. 1. A spring 5 is connected with the short rear arm of the hook 2 for the purpose of automatically releasing the latter from the cross-bar when it is desired to lower the shaft or thill 4. The form of spring employed is a spiral, which is coiled about the vertical member of the bracket, its upper end being attached thereto by a pin 6. The spring is thus free to expand downward and its lower end is connected by a double hook 7—see Fig. 3—with the short arm of the hook 2. It will be seen that the tendency of the spring to expand downward exerts a constant pull on the hook 2, tending to raise it to the position indicated in Fig. 2. When the hook 2 is engaged with the cross-bar 3, it is held in such engagement by the forward pressure on the shafts or thills due to their weight; but when the shafts are pushed backward slightly, the hook is automatically disengaged from the cross-bar and thrown upward by the action of the spring.

In the modification shown in Fig. 4, a bracket 1ª is attached to a buggy-body and the hook 2ª pivoted thereto is curved upward and thus adapted to engage a shaft cross-bar from below instead of above, as in the form illustrated in Figs. 1 and 2. A plate spring 5ª is employed in this case, its lower end being secured to the vertical member of the bracket 1ª and its upper free end pressing against the beveled end of the hook 2ª, thus tending to throw it downward to the position shown by dotted lines, which action is assisted by the gravity of the hook.

It will be seen that when the hook is engaged with the shaft cross-bar, the pressure of the latter will retain the engagement normally; but when the shafts are lifted or pressed upward slightly, the tension of the spring will throw the hook down out of engagement automatically.

In the arrangement illustrated in Figs. 1 and 2, the bracket 1 extends forward and projects upward in rear of the elliptic spring commonly used for supporting buggy-bodies.

In the modification shown in Fig. 5, a vertical bar 1ᵇ is adapted to slide in the front end of a horizontal bar 1ᶜ which, in practice, is secured to a buggy-body, and the said bar 1ᵇ may be clamped in any vertical adjustment by means of a thumb-screw. A hook is, in practice, to be pivoted to the upper end of bar 1ᵇ.

In Fig. 6, the same adjustment of a vertical bar 1ᵇ is provided for, but the hook-shaped bracket 1ᵈ is adapted to be secured to the front spring of a buggy instead of its body. In brief, it is to be understood that I propose to attach the bracket supporting the hook and spring attachment in any manner which convenience or judgment may dictate.

In Fig. 7, the spiral spring 5ᵇ is shown surrounding the vertical bracket and its lower end secured to a pin passing through the bracket, while the upper end is connected with the short arm of a hook $2^b$.

What I claim is:—

1. A buggy-shaft support, comprising a rigid bracket attached to the under side and front end of a buggy bottom, and projecting upward between the dasher and the front spring, a hook pivoted to the upper end of the bracket, and a spring arranged to bear upon the rear arm of the hook and tending to throw the hook out of engagement with the shaft cross-bar as shown and described.

2. A buggy shaft support, comprising a bracket adapted for fixed attachment to a buggy-body, a hook pivoted thereto and adapted to swing forward, and a spring attachment for automatically releasing the hook from a shaft cross-bar, the same comprising a spiral expansion spring applied to the bracket, and a device connecting the lower end of the spring with the short rear arm of the hook, substantially as described.

3. The combination with a buggy-body, of a shaft support comprising a right-angular bracket whose horizontal member is secured to the buggy-body, a hook pivoted to the vertical member of the bracket and adapted to swing forward for engagement with a shaft cross-bar, a spring attachment comprising a spiral expansion spring applied to the vertical member of the bracket, and a hook engaging the lower end of the spring and connecting it with the short rear arm of the cross-bar hook, thus applying a constant pressure tending to throw the hook upward, as shown and described.

BRADY MURPHY PERDUE.

Witnesses:
J. M. SLOSS,
GEO. B. KRUPP, Jr.

Copies of this patent may be obtained for five cents each, by addressing the "Commissioner of Patents, Washington, D. C."